(12) United States Patent
Tanaka et al.

(10) Patent No.: US 10,974,196 B2
(45) Date of Patent: Apr. 13, 2021

(54) FLUE GAS DENITRATION SYSTEM, INCINERATOR, AND FLUE GAS DENITRATION METHOD

(71) Applicant: HITACHI ZOSEN CORPORATION, Osaka (JP)

(72) Inventors: Toru Tanaka, Osaka (JP); Shohei Kubo, Osaka (JP)

(73) Assignee: Hitachi Zosen Corporation, Osaka (JP)

( * ) Notice: Subject to any disclaimer, the term of this patent is extended or adjusted under 35 U.S.C. 154(b) by 199 days.

(21) Appl. No.: 16/305,233

(22) PCT Filed: Feb. 7, 2017

(86) PCT No.: PCT/JP2017/004421
§ 371 (c)(1),
(2) Date: Nov. 28, 2018

(87) PCT Pub. No.: WO2017/208502
PCT Pub. Date: Dec. 7, 2017

(65) Prior Publication Data
US 2020/0188851 A1    Jun. 18, 2020

(30) Foreign Application Priority Data

May 31, 2016 (JP) .............................. JP2016-108480

(51) Int. Cl.
*B01D 53/86*      (2006.01)
*B01D 53/56*      (2006.01)
*B01D 53/90*      (2006.01)

(52) U.S. Cl.
CPC ......... *B01D 53/8631* (2013.01); *B01D 53/56* (2013.01); *B01D 53/90* (2013.01);
(Continued)

(58) Field of Classification Search
CPC .......... F23J 2219/10; F23J 15/02; F23J 15/08; F23J 2215/101; F23J 2215/10;
(Continued)

(56) References Cited

U.S. PATENT DOCUMENTS 3,870,474 A * 3/1975 Houston ................. F23G 7/068
                                                                      422/171
4,160,009 A    7/1979 Hamabe
(Continued)

FOREIGN PATENT DOCUMENTS

AT           399 828 B * 6/1995 ......... B01D 53/8625
CN         102741514 A    10/2012
(Continued)

OTHER PUBLICATIONS

Extended European Search Report dated Jan. 21, 2020 issued in corresponding EP Application No. 17806064.6.
(Continued)

*Primary Examiner* — Timothy C Vanoy
(74) *Attorney, Agent, or Firm* — Pillsbury Winthrop Shaw Pittman, LLP

(57) ABSTRACT

A flue gas denitration system includes a catalytic reactor accommodating a plurality of catalytic modules, into which a flue gas flows, and a flue gas heater provided on an upstream side of the catalytic reactor in a flow direction of the flue gas. In the flue gas denitration system, switched are a first denitration state in which the flue gas is denitrated by using the plurality of catalytic modules in the catalytic reactor and a second denitration state in which the flue gas is denitrated by using a catalytic module(s) less than those used in the first denitration state while a temperature of the flue gas flowing into the catalytic reactor is made higher than that in the first denitration state by using the flue gas heater. Thus, by making the temperature of the flue gas flowing into
(Continued)

the catalytic reactor higher, it is possible to suppress deterioration in denitration performance in the case of using part of the plurality of catalytic modules for denitration.

15 Claims, 11 Drawing Sheets

(52) U.S. Cl.
CPC ............... *B01D 2251/2062* (2013.01); *B01D 2257/302* (2013.01); *B01D 2257/404* (2013.01); *B01D 2258/0283* (2013.01); *F23J 2219/10* (2013.01)

(58) Field of Classification Search
CPC ........ B01D 53/8696; B01D 2255/9045; B01D 2257/302; B01D 2258/0291; B01D 2257/404; B01D 53/90; B01D 2258/0283; B01D 53/56; B01D 2251/2062; B01D 53/8631; B01D 53/565; F23G 5/00; B09B 3/00
See application file for complete search history.

(56) References Cited

U.S. PATENT DOCUMENTS

| | | | |
|---|---|---|---|
| 5,365,734 A | 11/1994 | Takeshima | |
| 5,589,142 A * | 12/1996 | Gribbon | F23G 7/07 422/171 |
| 5,591,417 A * | 1/1997 | Buchanan | B01D 53/04 423/210 |
| 5,635,142 A | 6/1997 | Ichiki et al. | |
| 5,759,022 A * | 6/1998 | Koppang | F23L 7/007 431/5 |
| 6,103,205 A * | 8/2000 | Wojtowicz | B01D 53/04 423/210 |
| 6,709,602 B2 * | 3/2004 | Spritzer | B09B 3/00 210/750 |
| 10,569,220 B2 * | 2/2020 | Binninger | B01D 53/005 |
| 2006/0147856 A1 * | 7/2006 | Lai | F23G 7/068 431/115 |
| 2008/0050297 A1 * | 2/2008 | Harold | B01D 53/79 423/239.1 |
| 2009/0130011 A1 * | 5/2009 | Abrams | B01D 53/90 423/239.1 |

FOREIGN PATENT DOCUMENTS

| | | | | |
|---|---|---|---|---|
| EP | 2216523 A1 | 8/2010 | | |
| EP | 2687283 A1 | 1/2014 | | |
| EP | 2 216 523 B1 * | 6/2017 | ......... | B01D 53/9431 |
| JP | 53-18403 A | 2/1978 | | |
| JP | 54-118382 A | 9/1979 | | |
| JP | 62-14924 A | 1/1987 | | |
| JP | 5-285343 A | 11/1993 | | |
| JP | 5-288042 A | 11/1993 | | |
| JP | 10-15345 A | 1/1998 | | |
| JP | 10-192657 A | 7/1998 | | |
| JP | 2002-119830 A | 4/2002 | | |
| JP | 2003-172134 A | 6/2003 | | |
| JP | 2005-226560 A | 8/2005 | | |

OTHER PUBLICATIONS

International Preliminary Report on Patentability dated Dec. 4, 2018 issued in corresponding International Patent Application No. PCT/JP2017/004421 with English translation.
International Search Report PCT/JP2017/004421 dated Mar. 28, 2017 with English translation.
The First Office Action Chinese Patent Application No. 201780033046.5 dated Jun. 20, 2019 with English translation.

* cited by examiner

FIG. 5

| FLUE GAS TEMPERATURE DURING DENITRATION | REQUIRED VOLUME OF CATALYSTS |
|---|---|
| 170°C | 26.8 |
| 180°C | 23.5 |
| 190°C | 20.3 |
| 200°C | 18.6 |
| 210°C | 15.0 |
| 220°C | 13.7 |

FLUE GAS DENITRATION SYSTEM, INCINERATOR, AND FLUE GAS DENITRATION METHOD

CROSS-REFERENCE TO RELATED APPLICATIONS

This application is the U.S. National Stage of PCT/JP2017/004421, filed Feb. 7, 2017, which in turn claims priority to Japanese Patent Application No. 2016-108480, filed May 31, 2016. The contents of each of these applications are incorporated herein by reference in entirety.

TECHNICAL FIELD

The present invention relates to a flue gas denitration system, an incinerator, and a flue gas denitration method.

BACKGROUND ART

It is well known that in a flue gas denitration system using catalysts, ammonium sulfate and acidic ammonium sulfate are deposited as reaction products on catalyst surfaces, with an operating temperature of a catalytic reactor and concentrations of moisture, sulfur trioxide, and ammonia in a flue gas as factors. With the deposition of the reaction products, the catalytic activity is deteriorated and required denitration performance cannot be achieved. Then, by regularly carrying the catalysts outside and performing a water washing treatment or a heating treatment on the catalysts, the catalysts are recovered. In the case of performing the above operation, however, it is necessary to stop the operations of the flue gas denitration system and a facility including the system. Then, Japanese Patent Application Laid-Open No. 10-192657 (Document 1) discloses a method of recovering catalysts without stopping a facility. In this method, the inside of a catalyst tower (catalytic reactor) is divided into two or more chambers, and recovery of the catalysts is performed in each chamber while a flue gas is caused to pass through the other chambers, to be thereby denitrated.

Further, in a combustion flue gas cleaning method disclosed in Japanese Patent Application Laid-Open No. 10-15345, a combustion flue gas is introduced to a moving layer type desulfurization layer, to be thereby desulfurized, and then the desulfurized combustion flue gas is divided into two, temperature rise adjustment is performed in accordance with a desulfurization state of each divided flue gas, and ammonia catalytic reduction denitration is performed thereon in a denitration layer.

In the method of Document 1, when it is understood that a plurality of catalytic modules are provided in the catalyst tower (catalytic reactor), the number of catalytic modules to be used for denitration decreases during the recovery of the catalysts in each chamber and therefore the denitration performance is deteriorated.

SUMMARY OF INVENTION

The present invention is intended for a flue gas denitration system, and it is an object of the present invention to suppress deterioration in denitration performance in the case of using part of a plurality of catalytic modules for denitration.

The flue gas denitration system according to the present invention includes a catalytic reactor accommodating a plurality of catalytic modules, into which a flue gas flows, a flue gas heater provided on an upstream side of the catalytic reactor in a flow direction of the flue gas, and a control unit, and in the flue gas denitration system, the control unit switches between a first denitration state in which the flue gas is denitrated by using the plurality of catalytic modules in the catalytic reactor and a second denitration state in which the flue gas is denitrated by using a catalytic module(s) less than those used in the first denitration state while a temperature of the flue gas flowing into the catalytic reactor is made higher than that in the first denitration state by using the flue gas heater.

By the present invention, it is possible to suppress deterioration in denitration performance in the case of using part of the plurality of catalytic modules for denitration.

In a preferred embodiment of the present invention, the catalytic reactor has a plurality of catalytic chambers arranged in parallel with the flow of the flue gas, the plurality of catalytic modules are accommodated in the plurality of catalytic chambers, and a plurality of flow paths of the flue gas leading from the flue gas heater to the plurality of catalytic chambers are individually openable and closable.

In this case, preferably, the flue gas denitration system further includes a catalyst recovery part capable of selectively supplying the plurality of catalytic chambers with a catalyst recovery gas.

More preferably, the catalyst recovery part includes a circulation flow path for circulating a circulating gas and a circulating gas heater provided in the circulation flow path, for heating the circulating gas, the control unit includes a catalytic chamber selected out of the plurality of catalytic chambers in part of the circulation flow path, and the catalyst recovery gas is the circulating gas which has been heated to a predetermined temperature or higher by circulation.

For example, a desulfurization apparatus is provided in an exhaust path for discharging the flue gas from a generation source of the flue gas, and the catalyst recovery gas passing through the selected catalytic chamber flows into an upstream side of the desulfurization apparatus in the exhaust path.

In another preferred embodiment of the present invention, the catalytic reactor includes a catalytic chamber into which the flue gas flows and a catalyst recovery chamber provided adjoining the catalytic chamber, to which a catalyst recovery gas is supplied, and the control unit selectively arranges each of the plurality of catalytic modules into the catalytic chamber or the catalyst recovery chamber.

The present invention is also intended for an incinerator. The incinerator according to the present invention includes a combustion chamber in which waste is burned, an exhaust path for discharging a flue gas generated in the combustion chamber, from the combustion chamber, and a flue gas denitration system defined as above which is provided in the exhaust path.

The present invention is still also intended for a flue gas denitration method in the flue gas denitration system.

These and other objects, features, aspects and advantages of the present invention will become more apparent from the following detailed description of the present invention when taken in conjunction with the accompanying drawings.

BRIEF DESCRIPTION OF DRAWINGS

FIG. 5 is a table showing a relation between a flue gas temperature during denitration and the required volume of catalysts;

DESCRIPTION OF EMBODIMENTS

Figure 1:
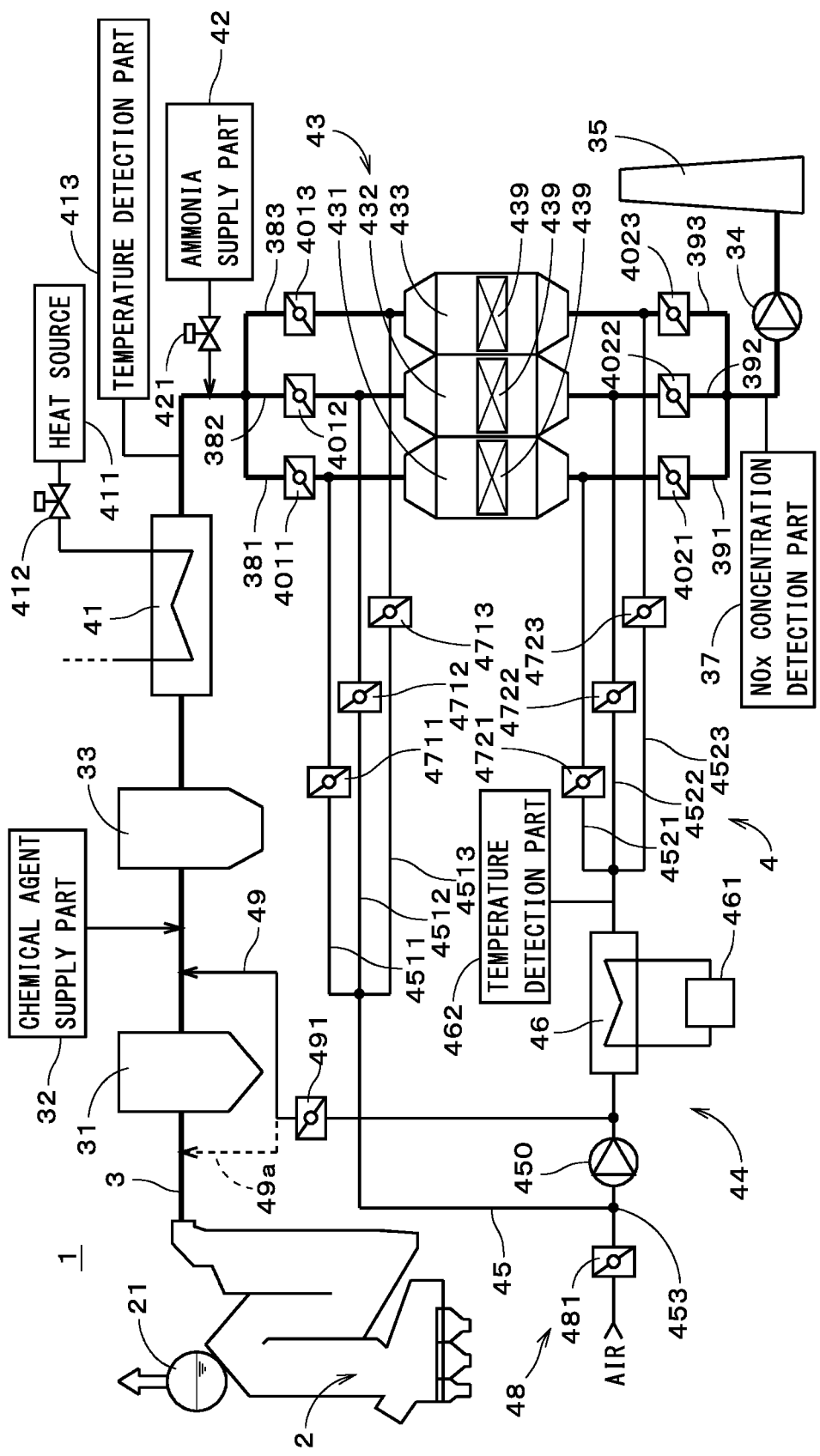
FIG. 1 is a view showing a configuration of an incinerator.

FIG. 1 is a view showing a configuration of an incinerator 1 in accordance with a preferred embodiment of the present invention. The incinerator 1 is, for example, a stoker-type furnace which burns garbage that is waste while conveying the same by using a plurality of grates. The incinerator 1 may be a furnace (e.g., a fluidized bed furnace, a kiln furnace, or the like) other than the stoker-type furnace.

The incinerator 1 includes a combustion chamber 2 and an exhaust path 3. The combustion chamber 2 burns garbage and burns a combustible gas generated from the garbage. The exhaust path 3 discharges a flue gas (combustion gas) generated in the combustion chamber 2, from the combustion chamber 2, and guides the gas to a stack 35. Specifically, the flue gas generated from the combustion chamber 2 as a generation source flows inside the exhaust path 3 from the combustion chamber 2 to the stack 35. The stack 35 discharges the flue gas to the atmosphere. In FIG. 1, the exhaust path 3 is indicated by a heavy solid line.

In the exhaust path 3, from the combustion chamber 2 toward the stack 35, i.e., from an upstream side toward a downstream side in a flow direction of the flue gas, provided are a gas cooler 31, a chemical agent supply part 32, a bag filter 33, a flue gas denitration system 4, and an induced draft fan 34 in this order. The gas cooler 31 reduces a temperature of the flue gas by supplying the flue gas with water. The chemical agent supply part 32 causes dechlorination and desulfurization reactions on the flue gas flowing in the exhaust path 3 inside the exhaust path 3 and the bag filter 33 by blowing chemical agents for dechlorination and desulfurization (for example, hydrated lime powder) into the exhaust path 3 on an inlet side of the bag filter 33, to thereby remove the reaction products and dust contained in the flue gas. In other words, the chemical agent supply part 32 and the bag filter 33 are both a dechlorination apparatus and a desulfurization apparatus. The bag filter 33 also removes dust contained in the flue gas. The flue gas denitration system 4 injects ammonia on an inlet side thereof, to decompose a nitrogen oxide (NOx) by catalytic reaction and decompose dioxin generated by combustion of waste, depending on the catalysts to be used. The induced draft fan 34 guides the flue gas in the exhaust path 3 to the stack 35.

Figure 2:
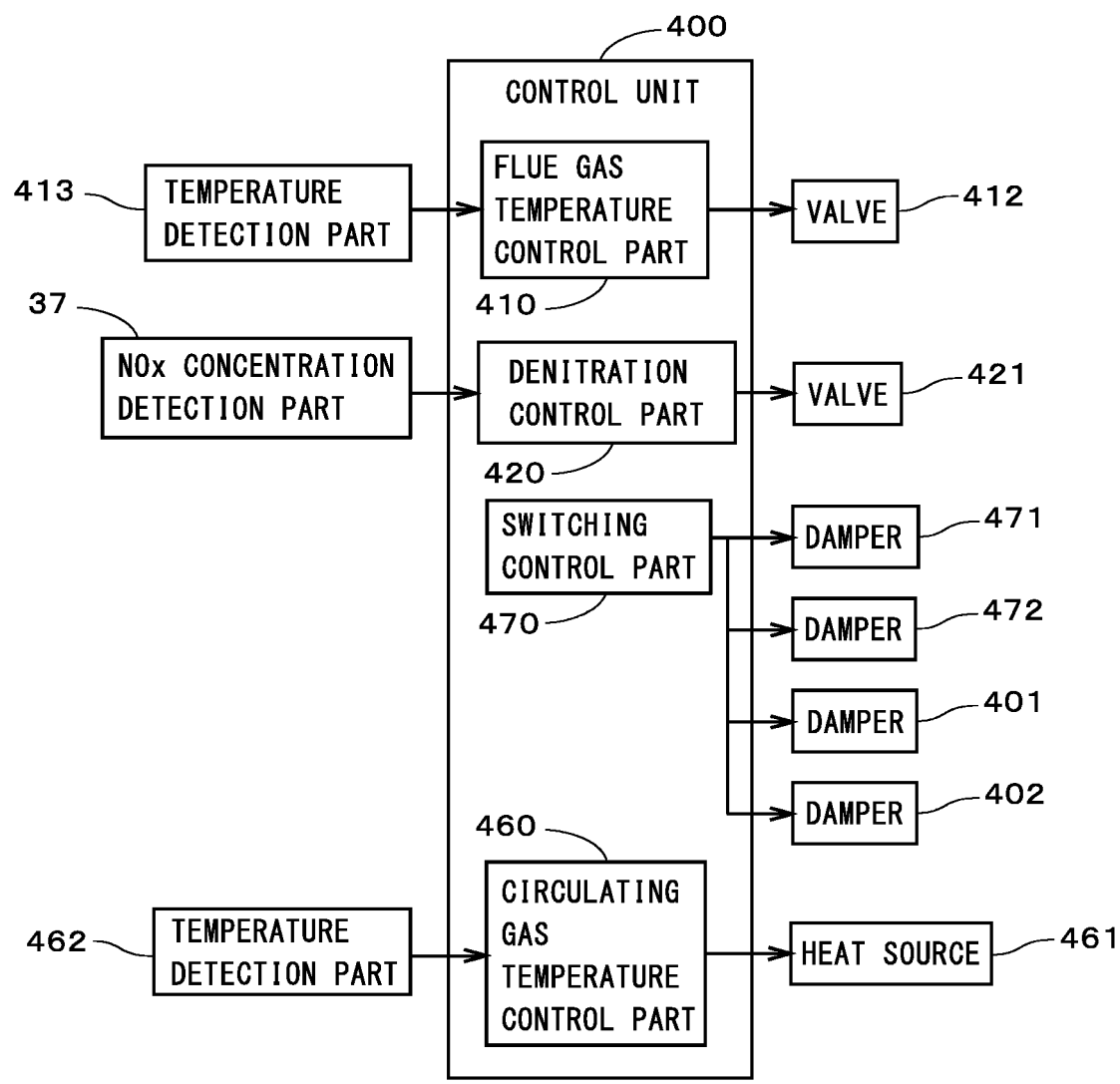
FIG. 2 is a view showing a configuration of a control unit.

The flue gas denitration system 4 includes a flue gas heater 41, an ammonia supply part 42, a catalytic reactor 43, a catalyst recovery part 44, and a control unit 400 of FIG. 2. The control unit 400 performs general control of the flue gas denitration system 4. The control unit 400 includes a flue gas temperature control part 410, a denitration control part 420, a switching control part 470, and a circulating gas temperature control part 460.

The flue gas heater 41 of FIG. 1 is provided in the exhaust path 3. To the flue gas heater 41, a heat source 411 is connected through a valve 412. Further, in the vicinity of a downstream side of the flue gas heater 41 in the exhaust path 3, provided is a temperature detection part 413 which detects a temperature of the flue gas discharged from the flue gas heater 41. A detection value of the temperature detection part 413 is inputted to the flue gas temperature control part 410, and by the control over the degree of opening of the valve 412 on the basis of the detection value, a flow rate of a heating medium to be supplied from the heat source 411 to the flue gas heater 41 is changed. The heat source 411 is, for example, a boiler 21 provided on an upper portion of the combustion chamber 2, and steam from the boiler 21 is supplied as the heating medium to the flue gas heater 41. The flue gas discharged from the bag filter 33 is heated to a predetermined temperature by the flue gas heater 41.

The ammonia supply part 42 is connected to the exhaust path 3 through a valve 421, and supplies ammonia as a reducing agent to the flue gas discharged from the flue gas heater 41 on an upstream side of inflow paths 381 to 383 leading to the catalytic reactor 43 which branches into a plurality of chambers. The ammonia supply part 42 may be provided on an upstream side of the flue gas heater 41, and is preferably provided on a downstream side of the bag filter 33. A denitration control part 420 is connected to the ammonia supply part 42 in order to control the supply amount by the control over the degree of opening of the valve 421 or the control over the stroke, the number of rotation, and the like of an aqueous ammonia supply pump. The denitration control part 420 has the function of controlling the ammonia supply amount on the basis of an input value from a NOx concentration detection part 37 which detects a NOx concentration in the flue gas discharged from the stack 35. Sometimes a NOx concentration detection part is also provided at an outlet of the bag filter 33 in order to improve the controllability. The catalytic reactor 43 which is a catalytic reactor has a plurality of catalytic chambers 431, 432, and 433. The plurality of catalytic chambers 431 to 433 accommodate a plurality of catalytic modules 439, respectively. In the exemplary case shown in FIG. 1, one catalytic module 439 is accommodated in each of the catalytic chambers 431 to 433. In the present preferred embodiment, the same volume of catalysts is held in each of the plurality of catalytic chambers 431 to 433.

In the vicinity of an upstream side of the catalytic reactor 43, the exhaust path 3 branches into a plurality of inflow paths 381 to 383, and the plurality of inflow paths 381 to 383 are connected to respective inflow ports of the plurality of catalytic chambers 431 to 433. The inflow paths 381 to 383 are provided with dampers 4011 to 4013, respectively. A plurality of outflow paths 391 to 393 in the exhaust path 3 are connected to respective outflow ports of the plurality of catalytic chambers 431 to 433 and are joined and connected to the induced draft fan 34. The outflow paths 391 to 393 are provided with dampers 4021 to 4023, respectively. In the flue gas denitration system 4, provided are the flue gas heater 41, the ammonia supply part 42, and the catalytic reactor 43 in this order from the upstream side toward the downstream side of the exhaust path 3. In the exemplary case shown in FIG. 1, three catalytic chambers 431 to 433 are provided, and in the following description, are referred to as a "first catalytic chamber 431", a "second catalytic chamber 432", and a "third catalytic chamber 433", respectively.

The catalyst recovery part 44 has a circulation flow path 45, a circulating gas heater 46, and a circulating gas fan 450. The circulating gas heater 46 and the circulating gas fan 450 are provided in the circulation flow path 45. The circulation flow path 45 has a plurality of first auxiliary flow paths 4511 to 4513 and a plurality of second auxiliary flow paths 4521 to 4523. The plurality of first auxiliary flow paths 4511 to 4513 are connected to the plurality of inflow paths 381 to 383, respectively. The first auxiliary flow paths 4511 to 4513 are provided with dampers 4711 to 4713, respectively. The plurality of first auxiliary flow paths 4511 to 4513 are joined to one another into one flow path on an opposite side of the inflow paths 381 to 383 and connected to the circulating gas fan 450. The plurality of second auxiliary flow paths 4521 to 4523 are connected to the plurality of outflow paths 391 to 393, respectively. The second auxiliary flow paths 4521 to 4523 are provided with dampers 4721 to 4723, respectively. The plurality of second auxiliary flow paths 4521 to 4523 are joined to one another into one flow path on an opposite side of the outflow paths 391 to 393 and connected to the circulating gas heater 46.

In the catalyst recovery part 44, one of the first to third catalytic chambers 431 to 433 is selectively included in the circulation flow path 45. In a case, for example, where the circulation flow path 45 including the first catalytic chamber 431 is formed, the damper 4711 of the first auxiliary flow path 4511 connected to the inflow path 381 of the first catalytic chamber 431 and the damper 4721 of the second auxiliary flow path 4521 connected to the outflow path 391 of the first catalytic chamber 431 are opened and the remaining dampers 4712, 4713, 4722, and 4723 are closed. Further, the damper 4011 of the inflow path 381 of the first catalytic chamber 431 and the damper 4021 of the outflow path 391 thereof are also closed. The circulation flow path 45 leading from the first catalytic chamber 431 through (part of) the inflow path 381, the first auxiliary flow path 4511, the circulating gas fan 450, the circulating gas heater 46, the second auxiliary flow path 4521, and (part of) the outflow path 391 back to the first catalytic chamber 431 is thereby formed. The circulation flow path 45 including the second catalytic chamber 432 and the circulation flow path 45 including the third catalytic chamber 433 are also formed in the same manner as described above. In the flue gas denitration system 4, a switching part which includes the selected one of the plurality of catalytic chambers 431 to 433 in part of the circulation flow path 45 is implemented by the dampers 4711 to 4713 (generally referred to as a "damper 471" in FIG. 2) of the plurality of first auxiliary flow paths 4511 to 4513 and the dampers 4721 to 4723 (generally referred to as a "damper 472" in FIG. 2) of the plurality of second auxiliary flow paths 4521 to 4523, and the switching part is controlled by the switching control part 470. The switching control part 470 also performs control over the dampers 4011 to 4013 (generally referred to as a "damper 401" in FIG. 2) of the plurality of inflow paths 381 to 383 and the dampers 4021 to 4023 (generally referred to as a "damper 402" in FIG. 2) of the plurality of outflow paths 391 to 393.

In the exemplary case shown in FIG. 1, the gas (hereinafter, referred to as a "circulating gas") inside the circulation flow path 45 is circulated by driving of the circulating gas fan 450 through the circulating gas heater 46, one of the second auxiliary flow paths 4521 to 4523, the catalytic chamber, and one of the first auxiliary flow paths 4511 to 4513 in this order (counterclockwise in FIG. 1). The circulating gas may be circulated clockwise in the circulation flow path 45 of FIG. 1. The circulating gas heater 46 heats the circulating gas flowing inside the circulation flow path 45 by the heating medium from the heat source 461, and the like. In the vicinity of a downstream side of the circulating gas heater 46 (between the circulating gas heater 46 and the second auxiliary flow paths 4521 to 4523) in the circulation flow path 45, provided is a temperature detection part 462 which detects a temperature of the circulating gas. A detection value of the temperature detection part 462 is inputted to the circulating gas temperature control part 460, and the amount of heat of the circulating gas heater 46 is thereby controlled.

In the circulation flow path 45, to a position 453 (hereinafter, referred to as an "introduction position 453") between the plurality of first auxiliary flow paths 4511 to 4513 and the circulating gas fan 450, connected is an air introduction part 48. The air introduction part 48 has a damper 481. By opening the damper 481, outside air is introduced into the circulation flow path 45 by the circulating gas fan 450. In the circulation flow path 45, one end of a connection flow path 49 is connected between the circulating gas fan 450 and the circulating gas heater 46. The other end of the connection flow path 49 is connected to a position between the gas cooler 31 and (a supply position of the chemical agent from) the chemical agent supply part 32 in the exhaust path 3. The connection flow path 49 is provided with a damper 491. By opening the damper 491, part of the circulating gas flowing inside the circulation flow path 45 flows into the exhaust path 3 through the connection flow path 49.

Figure 3:
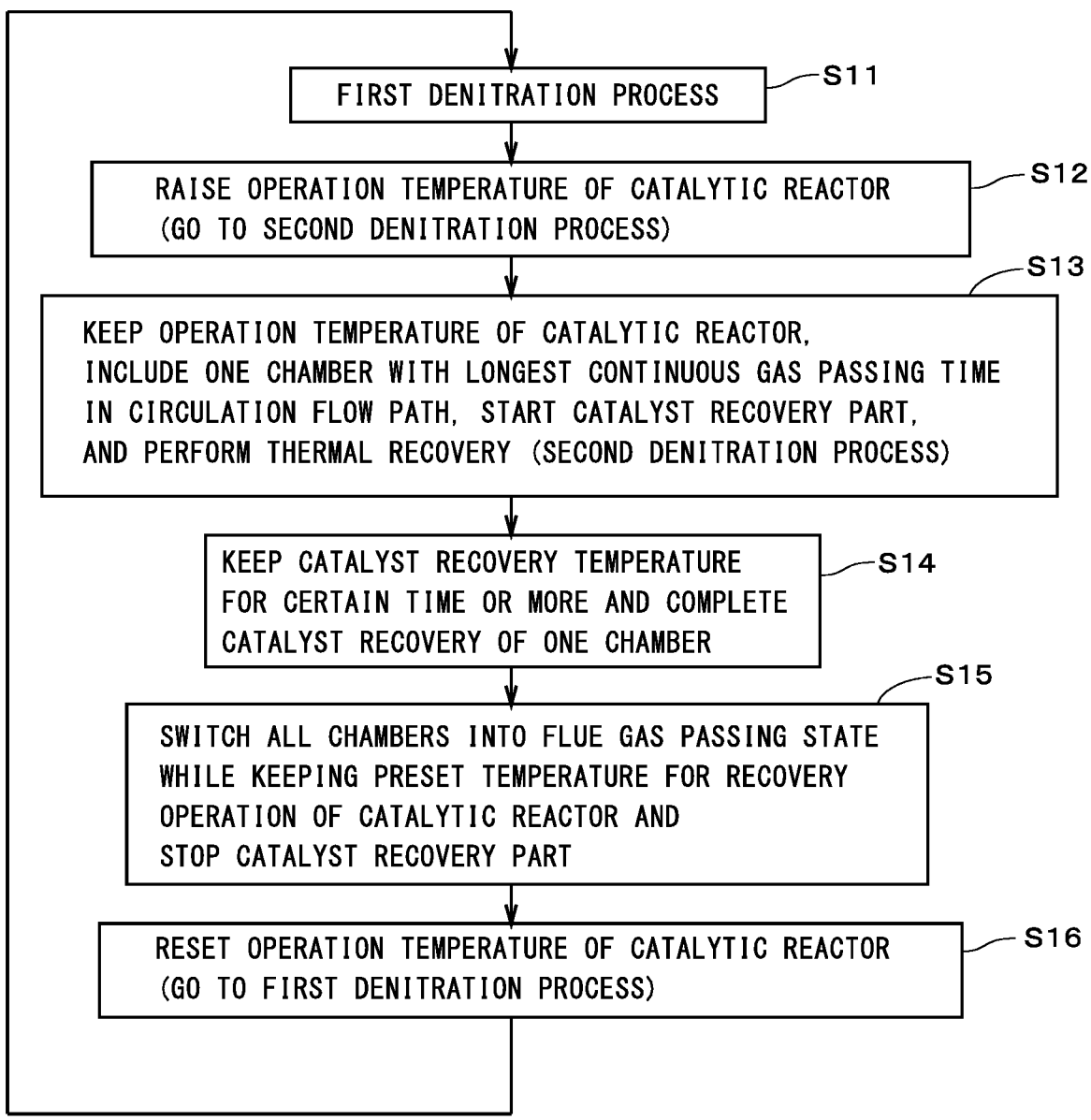
FIG. 3 is a flowchart showing an operation flow relating to denitration.
Figure 4:
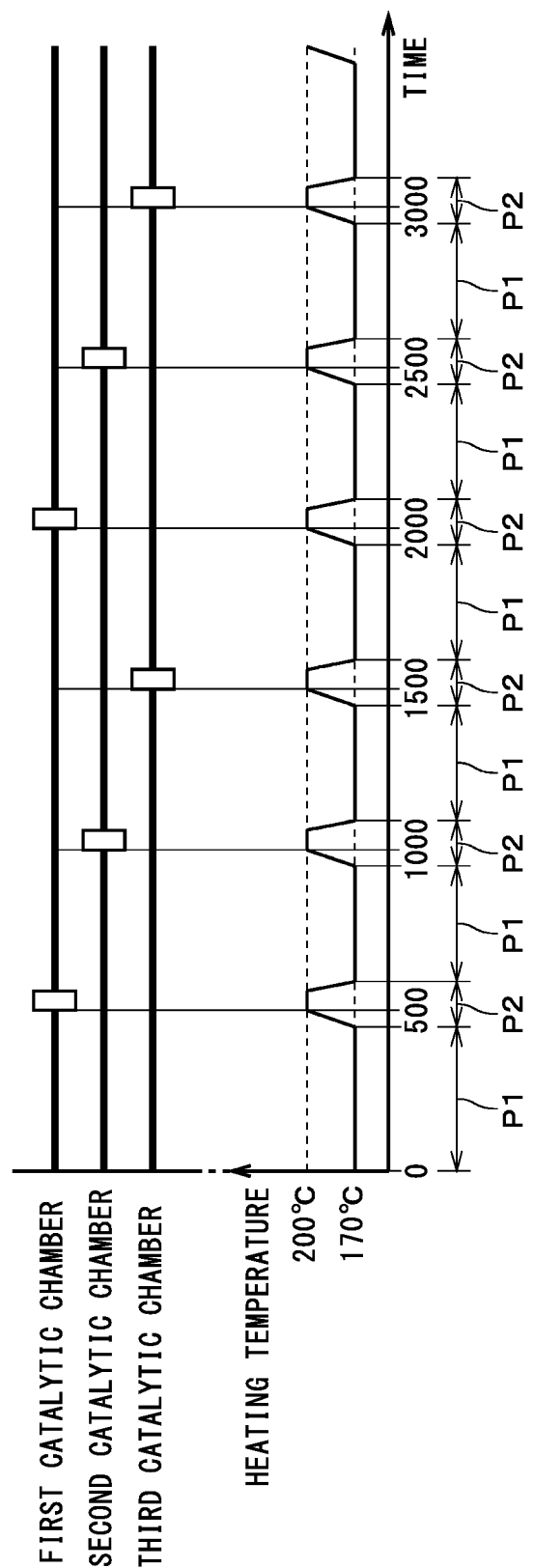
FIG. 4 is a time chart showing an operation relating to denitration.

FIG. 3 is a flowchart showing an operation flow relating to denitration in the incinerator 1, and FIG. 4 is a time chart showing an operation relating to denitration. In an upper stage of FIG. 4, a period while each catalytic chamber is used for denitration is indicated by a heavy solid line and another period while the catalytic chamber is not used is indicated by a blank rectangle. In a lower stage of FIG. 4, shown is a heating temperature of the flue gas by the flue gas heater 41, i.e., an operating temperature of the catalytic reactor 43. In the incinerator 1 of FIG. 1, while garbage is burned in the combustion chamber 2, denitration of the flue gas is performed in succession by the flue gas denitration system 4. During a normal operation in the flue gas denitration system 4, the flue gas discharged from the bag filter 33 is heated by the flue gas heater 41 to a constant preset temperature for normal operation of catalytic reactor (170° C. in FIG. 4). In FIG. 4, a period while the normal operation is performed in the flue gas denitration system 4 is indicated by an arrow with reference sign P1.

Further, in the normal operation, the dampers 4011 to 4013 of all the inflow paths 381 to 383 and the dampers 4021 to 4023 of all the outflow paths 391 to 393 are opened. The flue gas flowing in the exhaust path 3 thereby flows into the first to third catalytic chambers 431 to 433 through the plurality of inflow paths 381 to 383 in succession and is denitrated by the plurality of catalytic modules 439. In the preferable flue gas denitration system 4, a flowmeter and a differential pressure gauge which are not shown are provided, and the respective degrees of opening of the dampers 4011 to 4013 of the plurality of inflow paths 381 to 383, and the like, are controlled so that the flow rates of the flue gases flowing into the first to third catalytic chambers 431 to 433 may be equal to one another. The denitrated flue gas is guided to the stack 35 through the plurality of outflow paths 391 to 393 and discharged to the atmosphere. Thus, in the normal operation of the flue gas denitration system 4, a state (hereinafter, referred to as a "first denitration state") in which the flue gas is denitrated by using the catalytic modules 439 in the first to third catalytic chambers 431 to 433 while the temperature of the flue gas flowing into the catalytic reactor 43 is kept at the preset temperature for normal operation of catalytic reactor is maintained (Step S11). Further, in the first denitration state, the dampers 4711 to 4713 of all the first auxiliary flow paths 4511 to 4513 and the dampers 4721 to 4723 of all the second auxiliary flow paths 4521 to 4523 are closed.

After the normal operation has continued for a predetermined time, a high-temperature operation for recovering the catalytic module 439 in one of the catalytic chambers 431 to 433 is performed. In FIG. 4, a period while the high-temperature operation is performed in the flue gas denitration system 4 is indicated by an arrow with reference sign P2. In the high-temperature operation, first, the heating temperature of the flue gas by the flue gas heater 41 is gradually raised from the preset temperature for normal operation of catalytic reactor by the control of the flue gas temperature control part 410 (Step S12). When the heating temperature of the flue gas (i.e., the operation temperature of catalytic reactor) reaches a predetermined preset temperature for recovery operation of catalytic reactor (200° C. in FIG. 4), the heating temperature is maintained constant at the preset temperature for recovery operation of catalytic reactor.

Subsequently, among the plurality of catalytic chambers 431 to 433, a catalytic chamber selected as a catalytic chamber in which the catalytic module 439 thereinside should be recovered (herein, a catalytic chamber in which a continuous gas passing time is longest, and hereinafter, it will be referred to as a "selected catalytic chamber") is specified, and a damper of an inflow path connected to the selected catalytic chamber (the damper 4011, 4012, or 4013 of one of the inflow paths 381 to 383) and a damper of an outflow path connected to the selected catalytic chamber (the damper 4021, 4022, or 4023 of one of the outflow paths 391 to 393) are closed. In the flue gas denitration system 4, the catalytic module 439 in the selected catalytic chamber is not thereby used for denitration of the flue gas. On the other hand, the flue gas at the preset temperature for recovery operation of catalytic reactor higher than the preset temperature for normal operation of catalytic reactor flows in succession into the catalytic chambers used for denitration of the flue gas, i.e., all the catalytic chambers other than the selected catalytic chamber. Thus, in the flue gas denitration system 4, a state (hereinafter, referred to as a "second denitration state") in which the flue gas is denitrated by using catalytic modules 439 less than those in the first denitration state while the temperature of the flue gas flowing into the catalytic reactor 43 is made higher than that in the first denitration state by using the flue gas heater 41 is achieved. The second denitration state is maintained for a predetermined time period.

In the catalyst recovery part 44, the damper of the first auxiliary flow path connected to the selected catalytic chamber (the damper 4711, 4712, or 4713 of one of the first auxiliary flow paths 4511 to 4513) and the damper of the second auxiliary flow path connected to the selected catalytic chamber (the damper 4721, 4722, or 4723 of one of the second auxiliary flow paths 4521 to 4523) are opened by the control of the switching control part 470, and the circulation flow path 45 including the selected catalytic chamber is formed. In other words, the switching control part 470 includes the selected catalytic chamber in part of the circulation flow path 45. Subsequently, by starting to drive the circulating gas fan 450, circulation of a gas existing in the circulation flow path 45, i.e., the circulating gas is started. The circulation of the circulating gas is performed concurrently with the period of the second denitration state. As described later, the circulating gas is mainly air.

The circulating gas flowing inside the circulation flow path 45 is heated by the circulating gas heater 46 and the temperature of the circulating gas is gradually raised. At that time, since the temperature of the selected catalytic chamber itself is near the preset temperature for recovery operation of catalytic reactor, the temperature rise of the circulating gas becomes quicker. When the temperature of the circulating gas is raised to a predetermined catalyst recovery temperature (for example, about 300° C.), heat decomposition of unnecessary substances (herein, ammonium sulfate and acidic ammonium sulfate) adhered to the catalytic module 439 in the selected catalytic chamber is started (Step S13). For example, ammonium sulfate and acidic ammonium sulfate are decomposed into $SO_3$ (sulfur trioxide) and $NH_3$ (ammonia) and mixed into the circulating gas. In the catalyst recovery part 44, it is understood that the circulating gas at a predetermined temperature or higher is a gas for catalyst recovery.

When it is confirmed, by the temperature detection part 462, that the temperature of the circulating gas rises to a first preset temperature (for example, 300° C.), the outside air is introduced from the introduction position 453 into the circulation flow path 45 by the air introduction part 48. The introduction flow rate of air by the air introduction part 48 depends on the rate of temperature rise of the circulating gas, which is set in advance. Further, by opening the damper 491 of the connection flow path 49, part of the circulating gas flows into the vicinity of an upstream side of the chemical agent supply part 32 in the exhaust path 3 through the connection flow path 49. Together with sulfur oxide (SOx) in the flue gas, $SO_3$ contained in the circulating gas is removed in the exhaust path 3 and the bag filter 33. Further, $NH_3$ contained in the circulating gas is used for denitration reaction in the catalytic reactor 43 provided on a downstream side of the chemical agent supply part 32 (denitration reaction in the catalytic modules 439 of the catalytic chambers other than the selected catalytic chamber). Furthermore, in the circulation flow path 45, it is preferable that the degrees of opening of the dampers 481 and 491, and the like, should be adjusted so that the flow rate of the circulating gas flowing out from the connection flow path 49 may be equal to the flow rate of air flowing into the circulation flow path 45 by the air introduction part 48. Since the flow rate of the circulating gas flowing out from the connection flow path 49 into the exhaust path 3 is sufficiently lower than that of the flue gas flowing in the exhaust path 3, the temperature of the flue gas is not changed excessively by the mixture of the circulating gas.

In the circulating gas heater 46, when it is confirmed that the temperature of the circulating gas rises to a second preset temperature (for example, 370° C.) higher than the first preset temperature, the temperature of the circulating gas is maintained constant at the second preset temperature for a predetermined time. Thus, while maintaining the second denitration state, the removal of the unnecessary substances adhered to the catalytic module 439 in the selected catalytic chamber, i.e., thermal recovery of the catalytic module 439 is performed for a certain time (Step S14). In the exemplary case shown in FIG. 4, it is confirmed that the activity of the catalytic module 439 is recovered to 95% or more.

After that, driving of the circulating gas fan 450 is stopped and the circulation of the circulating gas in the circulation flow path 45 is thereby stopped. Further, it is desirable that an $SO_3$ concentration meter and an $NH_3$ concentration meter are provided in the connection flow path 49 and after it is confirmed that an $SO_3$ concentration and an $NH_3$ concentration of the circulating gas flowing from the circulation flow path 45 toward the exhaust path 3 are lowered to predetermined values or lower, the circulation of the circulating gas is stopped. When the temperature of the circulating gas is 370° C. or higher, since the unnecessary substances adhered to the catalytic module 439 are sublimated in a short time, there arises no problem if the above concentration meters are omitted. As a matter of course, in accordance with the type of the catalysts to be used and the like, the temperature of the circulating gas and the required time for recovery may be determined.

When the circulation of the circulating gas in the circulation flow path 45 is stopped, the damper 4711, 4712, or 4713 of the one of the first auxiliary flow paths 4511 to 4513 connected to the selected catalytic chamber and the damper 4721, 4722, or 4723 of the one of the second auxiliary flow paths 4521 to 4523 connected to the selected catalytic chamber are closed and the circulation flow path 45 including the selected catalytic chamber is cut off (the catalyst recovery part 44 is stopped). Then, the damper 4011, 4012, or 4013 of the one of the inflow paths 381 to 383 connected to the selected catalytic chamber and the damper 4021, 4022, or 4023 of the one of the outflow paths 391 to 393 connected to the selected catalytic chamber are opened and the flue gas flowing in the exhaust path 3 flows into all the catalytic chambers 431 to 433 (Step S15). In other words, all the catalytic chambers 431 to 433 are switched into a flue gas passing state. In the flue gas heater 41, the heating temperature of the flue gas is gradually lowered from the preset temperature for recovery operation of catalytic reactor (Step S16). When the temperature of the flue gas discharged from the flue gas heater 41 reaches the preset temperature for normal operation of catalytic reactor, the temperature is maintained constant at the preset temperature for normal operation of catalytic reactor. The catalytic reactor 43 is thereby returned to the first denitration state (Step S11).

Actually, by selecting each of the catalytic chambers 431 to 433 as the selected catalytic chamber in turn at regular time intervals and performing the process steps S12 to S16, the respective catalytic modules 439 in the catalytic chambers 431 to 433 are recovered. In the exemplary case shown in FIG. 4, respective timings when the first to third catalytic chambers 431 to 433 are selected as the selected catalytic chamber are shifted so that the period P2 in which the high-temperature operation is performed may occur at regular intervals (equal intervals), in other words, the recovery interval may be constant. Specifically, in each of the catalytic chambers 431 to 433, the recovery of the catalytic module 439 is performed once per 1500 hours, and in the whole catalytic reactor 43, the recovery of the catalytic module 439 is performed once per 500 hours. 1500 hours as the recovery interval is only one example, and an actual recovery interval is determined for each plant depending on design conditions, checks in a trial operation, and the like.

Herein, a relation between the temperature of the flue gas flowing into the catalytic reactor 43 (which is equal to the heating temperature of the flue gas by the flue gas heater 41 and hereinafter, referred to simply as an "flue gas temperature during denitration") and the volume of catalysts required in the catalytic reactor 43 (hereinafter, referred to simply as the "required volume of catalysts") will be described. FIG. 5 is a table showing a relation between the flue gas temperature during denitration and the required volume of catalysts. In the calculation of the required volume of catalysts at each flue gas temperature during denitration, the type of catalysts, the flow rate of the flue gas flowing into the catalytic reactor 43, the concentration of nitrogen oxide (or the concentration of dioxin) in the flue gas, the removal rate of nitrogen oxide (or the removal rate of dioxin), the leak amount of ammonia, and the like are set as predetermined conditions.

In the exemplary case shown in FIG. 5, when the flue gas temperature during denitration is always 170° C., the required volume of catalysts is 26.8 $m^3$. In a case where three catalytic chambers are provided in the catalytic reactor 43, in consideration of the period in which one catalytic chamber is not used due to recovery of the catalysts (hereinafter, referred to as a "partial use period"), the volume of catalysts required to fill the two catalytic chambers is 26.8 $m^3$. Actually, since the catalytic activity is gradually deteriorated due to the deposition of the unnecessary substances, there is a need to allow for some margin (the same applies to the following). On the other hand, assuming that the flue gas temperature during denitration in the normal operation is 170° C., by raising the flue gas temperature during denitration to 200° C. immediately before the partial use period, the volume of catalysts required to fill the two catalytic chambers becomes 18.6 $m^3$.

In other words, in the case where the flue gas temperature during denitration is always constant (the flue gas temperature during denitration is not raised in the partial use period), in the catalytic reactor 43 provided with two catalytic chambers and the catalytic reactor 43 provided with three catalytic chambers, the total volume of catalysts required to fill all the catalytic chambers (hereinafter, referred to as the "volume of catalysts for filling") becomes twice and 1.5 times the required volume of catalysts, respectively. In contrast to this, in a case where the flue gas temperature during denitration is raised in the partial use period from that in the normal operation, it is possible to reduce the volume of catalysts for filling. Specifically, in the case where the flue gas temperature during denitration is always constant at 170° C., in the catalytic reactor 43 provided with three catalytic chambers, the volume of catalysts for filling becomes 40.2 $m^3$ at the minimum. On the other hand, in the case where the flue gas temperature during denitration is raised to 200° C. in the partial use period, the volume of catalysts for filling becomes 27.9 $m^3$, and it is possible to make the volume of catalysts for filling almost equal to that in the case where the catalytic reactor 43 is provided with only one catalytic chamber while the flue gas temperature during denitration is always constant at 170° C. In the flue gas denitration system 4, assuming that the number of catalytic chambers is n (n is an integer not less than 2), in (n−1) catalytic chambers, the volume of catalysts for filling is determined so that the required denitration performance can be continuously achieved under the preset temperature for recovery operation of catalytic reactor. Actually, the volume of catalysts for filling is determined also in consideration of the deterioration in the catalytic activity in the recovery interval.

As described above, in the flue gas denitration system 4 of FIG. 1, provided are the catalytic reactor 43 accommodating the plurality of catalytic modules 439, into which the flue gas flows, and the flue gas heater 41 provided on the upstream side of the catalytic reactor 43 in the flow direction of the flue gas. Then, the control unit 400 switches between the first denitration state in which the flue gas is denitrated by using the plurality of catalytic modules 439 in the catalytic reactor 43 and the second denitration state in which the flue gas is denitrated by using a catalytic module(s) 439 less than those used in the first denitration state while the temperature of the flue gas flowing into the catalytic reactor 43 is made higher than that in the first denitration state by using the flue gas heater 41. Thus, by raising the temperature of the flue gas flowing into the catalytic reactor 43, it becomes possible to suppress deterioration in denitration performance in the case of using part of the plurality of catalytic modules 439 for denitration.

In the denitration with the catalysts, in a case where the flue gas from the bag filter and the like is reheated to 200 to 230° C. by the flue gas heater and caused to flow into the catalytic reactor, it is possible to reduce a rate of catalyst deterioration due to the deposition of ammonium sulfate and acidic ammonium sulfate and thereby possible to suppress deterioration in denitration performance. On the other hand, generally, steam generated in the boiler of the incinerator is often used for power generation, and reduction in the consumption of the steam in the incinerator itself increases power generation efficiency. Therefore, it is preferable that the heating temperature of the flue gas by the flue gas heater using the steam from the boiler should be lower. In a case, for example, where hydrated lime is used as a chemical agent for dechlorination and desulfurization, since the temperature of the flue gas in the bag filter is set at about 150° C., as the heating temperature is made higher in order to reduce the rate of catalyst deterioration due to the deposition of ammonium sulfate and acidic ammonium sulfate, the consumption of steam disadvantageously becomes higher.

In contrast to this, in the flue gas denitration system 4, since it is possible to make the flue gas temperature during denitration in the normal operation relatively low (170° C. in the exemplary case shown in FIG. 4), it is possible to make the heating temperature in the flue gas heater 41 low and reduce the consumption of steam. As a result, it is possible to increase the power generation efficiency in the incinerator 1. In a case, for example, where the flue gas at 150° C. in the normal operation is heated to 170° C. by the flue gas heater 41, it is possible to increase the power generation efficiency by about 1.5% as compared with another case where the flue gas is heated to a certain temperature (200° C.) in order to suppress the deposition of unnecessary substances. In the exemplary case shown in FIG. 4, though the consumption of steam in the incinerator 1 temporarily increases with the flue gas temperature during denitration at 200° C. at intervals of 500 hours, even if the incinerator 1 is operated for 8000 hours per year, the temporary increase in the consumption of steam occurs only 16 times. Since the thermal recovery of the catalytic module 439 is completed, for example, in about 12 hours, this does not cause a great loss.

In the flue gas denitration system 4 of FIG. 1, the catalytic reactor 43 has the plurality of catalytic chambers 431 to 433 arranged in parallel with the flow of the flue gas, and the plurality of flow paths (i.e., the inflow paths 381 to 383) of the flue gas leading from the flue gas heater 41 to the plurality of catalytic chambers 431 to 433 are individually openable and closable. In the flue gas denitration system 4, it is thereby possible to continuously perform denitration while the catalytic module 439 in part of the catalytic chambers is not used. It is thereby possible to ensure an operating time (the amount of incineration) required in the incinerator 1.

The catalyst recovery part 44 is capable of selectively supplying the plurality of catalytic chambers 431 to 433 with a catalyst recovery gas (the heated circulating gas in the above description). It is thereby possible to easily recover the catalytic modules 439 in the catalytic chambers 431 to 433 (i.e., on-line). Further, the switching control part 470 includes the selected catalytic chamber in part of the circulation flow path 45, and the circulating gas heater 46 heats the circulating gas circulated in the circulation flow path 45. It is thereby possible to easily prepare (generate) the catalyst recovery gas which is the circulating gas at a predetermined temperature or higher.

Further, in the exemplary case shown in FIG. 4, since the selected catalytic chamber itself accumulates heat by raising the flue gas temperature during denitration to 200° C. immediately before the thermal recovery, the heating temperature by the circulating gas heater 46 during the thermal recovery becomes, for example, about 120 to 170° C. As an example of thermal recovery, in the catalytic module 439 in which the preset temperature for normal operation of catalytic reactor is 180° C. and the activity is lowered to 80% immediately before the thermal recovery, by circulating the circulating gas at 320° C. for about two hours, the activity can be recovered to almost 100%.

As already described, the gas used for the thermal recovery of the catalytic module contains noxious $SO_3$ and $NH_3$. Herein, a flue gas denitration system of the comparative example is assumed in which a small amount of $SO_3$ and $NH_3$ are mixed into the flue gas to be discharged and the flue gas is discharged to the atmosphere. In the flue gas denitration system of the comparative example, the thermal recovery of the catalysts is performed while the temperature of the gas to be used for the thermal recovery is lower than respective sublimation temperatures of ammonium sulfate and acidic ammonium sulfate and decomposition rates of ammonium sulfate and acidic ammonium sulfate are made lower. In this case, however, it is necessary to control the decomposition rates of ammonium sulfate and acidic ammonium sulfate while checking the $SO_3$ concentration and the $NH_3$ concentration, and therefore the processing becomes complicated. Further, though there is a possible case where $SO_3$ and $NH_3$ contained in the gas used for the thermal recovery should be removed by using a dedicated removal apparatus, the manufacturing cost of the flue gas denitration system disadvantageously increases by additionally providing the removal apparatus in this case.

In contrast to this, in the flue gas denitration system 4 of FIG. 1, the desulfurization apparatus is provided in the exhaust path 3 leading from the combustion chamber 2 to the flue gas heater 41, and the circulating gas passing through the selected catalytic chamber flows into an upstream side of the desulfurization apparatus in the exhaust path 3. It is thereby possible to remove $SO_3$ and the like contained in the circulating gas passing through the selected catalytic chamber and appropriately discharge the flue gas to the atmosphere without performing a complicate processing such as the control over the decomposition rates of ammonium sulfate and acidic ammonium sulfate. Further, since the desulfurization apparatus is usually provided in the incinerator 1, it is possible to suppress an increase in manufacturing cost of the incinerator 1 and the flue gas denitration system 4. As already described, $NH_3$ contained in the circulating gas is used for the denitration reaction in the catalytic chambers during denitration (other than the selected catalytic chamber) in the catalytic reactor 43.

Though the chemical agent supply part 32 supplies chemical agents for dechlorination and desulfurization into the exhaust path 3 in the flue gas denitration system 4 of FIG. 1, in a case, for example, where the chemical agent supply part 32 is omitted and the gas cooler 31 is a semi-dry scrubber or the like which sprays a hydrated lime slurry by using an atomizer or in a spray, it is understood that the gas cooler 31 is a desulfurization apparatus. In this case, as indicated by the broken line with reference sign 49a in FIG. 1, an end portion of the connection flow path is connected in the vicinity of an upstream side of the gas cooler 31 and $SO_3$ and the like contained in the circulating gas are removed by the gas cooler 31.

In the incinerator 1, since properties of the flue gas are not stable due to variation in garbage components, the rate of catalyst deterioration is not always constant. Therefore, there may be a case where catalytic performance at each time is calculated from the nitrogen oxide concentration detected by the NOx concentration detection part 37 provided on an upstream side of the stack 35 and a timing for the thermal recovery of the catalytic module 439 is determined. In the flue gas denitration system 4 of FIG. 1, since it is possible to perform the thermal recovery of the catalytic module 439 while operating the incinerator 1, the timing for the thermal recovery can be freely determined.

Figure 6:
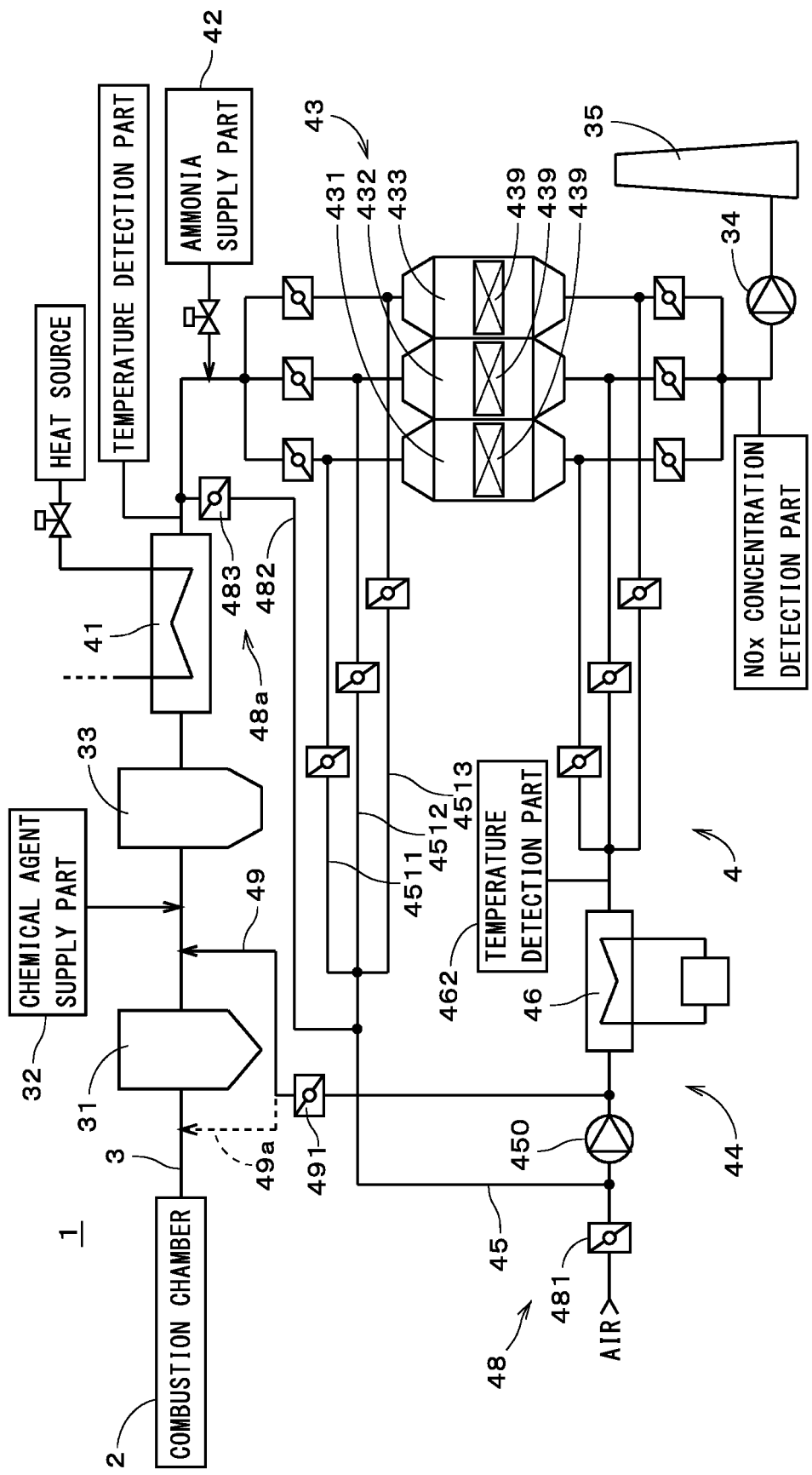
FIG. 6 is a view showing another example of a flue gas denitration system.

FIG. 6 is a view showing another example of a flue gas denitration system 4. In the flue gas denitration system 4 of FIG. 6, a flue gas introduction part 48a is additionally provided in the flue gas denitration system 4 of FIG. 1 and the flue gas can be introduced into the circulation flow path 45 of the catalyst recovery part 44. Other constituent elements are the same as those shown in FIG. 1 and the identical constituent elements are represented by the same reference signs.

The flue gas introduction part 48a includes a flue gas introduction flow path 482 and a damper 483. An end of the flue gas introduction flow path 482 is connected to a position between the flue gas heater 41 and the ammonia supply part 42 in the exhaust path 3. The other end of the flue gas introduction flow path 482 is connected to a position between the plurality of first auxiliary flow paths 4511 to 4513 and the circulating gas fan 450 in the circulation flow path 45. The damper 483 is provided in the flue gas introduction flow path 482.

When the thermal recovery of the catalytic module 439 in the selected catalytic chamber is performed, the circulation flow path 45 including the selected catalytic chamber is formed. Subsequently, by opening the damper 483 of the flue gas introduction flow path 482, the flue gas passing through the bag filter 33 and heated by the flue gas heater 41 is introduced into the circulation flow path 45. As already described, in the thermal recovery of the catalytic module 439, the temperature of the flue gas discharged from the flue gas heater 41 is raised to the preset temperature for recovery operation of catalytic reactor (for example, 200° C.) higher than that in the normal operation. Thus, the gas which has been at high temperature in advance is introduced into the circulation flow path 45. The flue gas is heated by the circulating gas heater 46 while being circulated in the circulation flow path 45 as the circulating gas by driving of the circulating gas fan 450. After the flue gas in the required amount is introduced into the circulation flow path 45 by opening the damper 483 of the flue gas introduction flow path 482 for a certain time, the damper 483 is closed.

When it is confirmed by the temperature detection part 462 that the temperature of the circulating gas is raised to the first preset temperature (for example, 300° C.), the dampers 483 and 491 are opened. Introduction of the flue gas by the flue gas introduction part 48a is thereby restarted and part of the circulating gas containing products ($SO_3$ and the like) generated by the thermal recovery flows in the vicinity of the upstream side of the chemical agent supply part 32 in the exhaust path 3 through the connection flow path 49. As already described, $SO_3$ and the like in the circulating gas flowing into the exhaust path 3 are removed in the exhaust path 3 and the bag filter 33. After the thermal recovery of the catalytic module 439 is completed, the damper 483 is closed and the damper 481 of the air introduction part 48 is opened. The outside air is thereby introduced into the circulation flow path 45 and the gas in the circulation flow path 45 is replaced by the air. After that, the dampers 481 and 491 are closed and the driving of the circulating gas fan 450 is stopped. Then, the state is returned to the first denitration state in which the flue gas is denitrated by using the catalytic modules 439 in all the catalytic chambers 431 to 433.

As described above, in the flue gas denitration system 4 of FIG. 6, the flue gas heated by the flue gas heater 41 is introduced into the circulation flow path 45 in the catalyst recovery part 44, and heated by the circulating gas heater 46 while being circulated in the circulation flow path 45 as the circulating gas. As compared with the exemplary case shown in FIG. 1 where the outside air is introduced into the circulation flow path 45, it is thereby possible to heat the circulating gas to a predetermined catalyst recovery temperature in a shorter time while reducing heat consumption in the circulating gas heater 46. Further, in the flue gas denitration system 4 of FIG. 6, like in the flue gas denitration system 4 of FIG. 1, there may be a case where the outside air is heated and used for the thermal recovery of the catalytic module 439.

Figure 7:
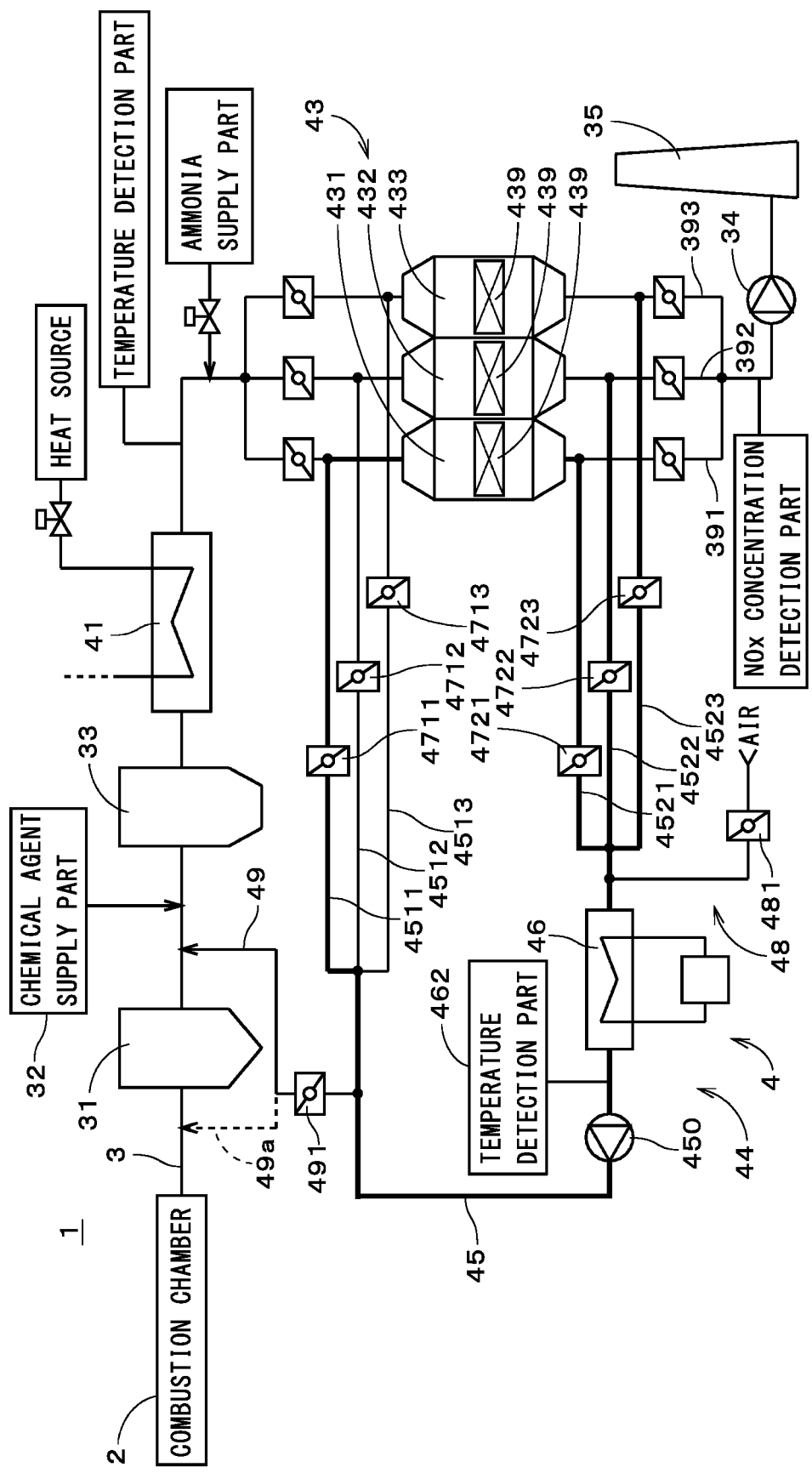
FIG. 7 is a view showing still another example of a flue gas denitration system.

The method of introducing the flue gas into the circulation flow path 45 can be performed by another configuration. FIG. 7 is a view showing still another example of a flue gas denitration system 4. In the flue gas denitration system 4 of FIG. 7, the circulating gas fan 450 is attached in an orientation opposite to that in the case of FIG. 1 so that the circulating gas may be circulated clockwise in the circulation flow path 45. Further, in the circulation flow path 45, the connection flow path 49 is connected to a position between the circulating gas fan 450 and the plurality of first auxiliary flow paths 4511 to 4513 and the air introduction part 48 is connected to a position between the plurality of second auxiliary flow paths 4521 to 4523 and the circulating gas heater 46. Furthermore, the temperature detection part 462 is provided between the circulating gas heater 46 and the circulating gas fan 450.

In the first denitration state in the flue gas denitration system 4 of FIG. 7, by slightly opening the dampers 4721 to 4723 of the plurality of second auxiliary flow paths 4521 to 4523 and the dampers 4711 to 4713 of the plurality of first auxiliary flow paths 4511 to 4513, the circulation flow path 45 including all the catalytic chambers 431 to 433 is formed. Then, part of the flue gas passing through the catalytic chambers 431 to 433 is returned to the catalytic chambers 431 to 433 through the second auxiliary flow paths 4521 to 4523, the circulating gas heater 46, the circulating gas fan 450, and the first auxiliary flow paths 4511 to 4513 in this order. The temperature of almost the whole of circulation flow path 45 thereby becomes near the preset temperature for normal operation of catalytic reactor (for example, 170 to 200° C.) and occurrence of corrosion (low-temperature corrosion) in the circulation flow path 45 is suppressed. Further, the circulating gas heater 46 is in an OFF state and heating of the gas is not performed in the circulation flow path 45. Most part of the flue gas passing through the catalytic chambers 431 to 433 is guided to the stack 35 through the outflow paths 391 to 393. In the first denitration state, by slightly opening also the damper 491 of the connection flow path 49, part of the flue gas in the circulation flow path 45 flows in the vicinity of the upstream side of the chemical agent supply part 32 in the exhaust path 3 through the connection flow path 49. It is thereby possible to also suppress occurrence of corrosion in the connection flow path 49.

When the thermal recovery of the catalytic module 439 in the selected catalytic chamber is performed, the circulation flow path 45 including the selected catalytic chamber is formed. In a case, for example, where the first catalytic chamber 431 is the selected catalytic chamber, the circulation flow path 45 including the first catalytic chamber 431 is formed. At that time, the flue gas from the flue gas heater 41 does not flow into the first catalytic chamber 431 but flows into only the second catalytic chamber 432 and the third catalytic chamber 433. Further, the dampers 4722 and 4723 of the second auxiliary flow paths 4522 and 4523 connected to the second catalytic chamber 432 and the third catalyst chamber 433, respectively, are also opened. Part of the flue gas passing through the second catalytic chamber 432 and the third catalytic chamber 433 is thereby introduced into the circulation flow path 45 including the first catalytic chamber 431. In FIG. 7, the circulation flow path 45 and the second auxiliary flow paths 4522 and 4523 are indicated by heavy solid lines. The flue gas is heated by the circulating gas heater 46 while being circulated as the circulating gas in the circulation flow path 45 by driving of the circulating gas fan 450. After the flue gas in the required amount is introduced into the circulation flow path 45, the dampers 4722 and 4723 are closed. Further, in the introduction of the flue gas into the circulation flow path 45, the damper 4722 or 4723 of only one of the two second auxiliary flow paths 4522 and 4523 may be opened.

Similar to the exemplary case shown in FIG. 6, when it is confirmed by the temperature detection part 462 that the temperature of the circulating gas is raised to the first preset temperature (for example, 300° C.), the dampers 491, 4722, and 4723 are opened. The introduction of the flue gas from the second auxiliary flow paths 4522 and 4523 is thereby restarted and part of the circulating gas containing $SO_3$ and the like flows in the vicinity of the upstream side of the chemical agent supply part 32 in the exhaust path 3 through the connection flow path 49. After the thermal recovery of the catalytic module 439 is completed, the circulating gas heater 46 is turned off. Then, after a certain time has elapsed, the damper 491 is closed and the state of the catalytic reactor 43 is returned to the first denitration state in which the flue gas is denitrated by using the catalytic modules 439 in all the catalytic chambers 431 to 433. Further, in the state, the dampers 4721 to 4723 of the plurality of second auxiliary flow paths 4521 to 4523 and the dampers 4711 to 4713 of the plurality of first auxiliary flow paths 4511 to 4513 are slightly opened, and the circulation flow path 45 including all the catalytic chambers 431 to 433 is formed.

Herein, in the flue gas denitration system 4 of FIG. 6 in which the circulation flow path 45 is cold in the first denitration state, it is necessary to slowly warm the pipe when the thermal recovery of the catalytic module 439 is performed. In contrast to this, in the flue gas denitration system 4 of FIG. 7, in the first denitration state, the circulation flow path 45 is always warmed (warmed up) since the flue gas passing through the catalytic chambers 431 to 433 flows in the circulation flow path 45. It is thereby possible to increase the rate of temperature rise of the circulating gas and reduce the time required for the thermal recovery of the catalytic module 439.

Figure 8:
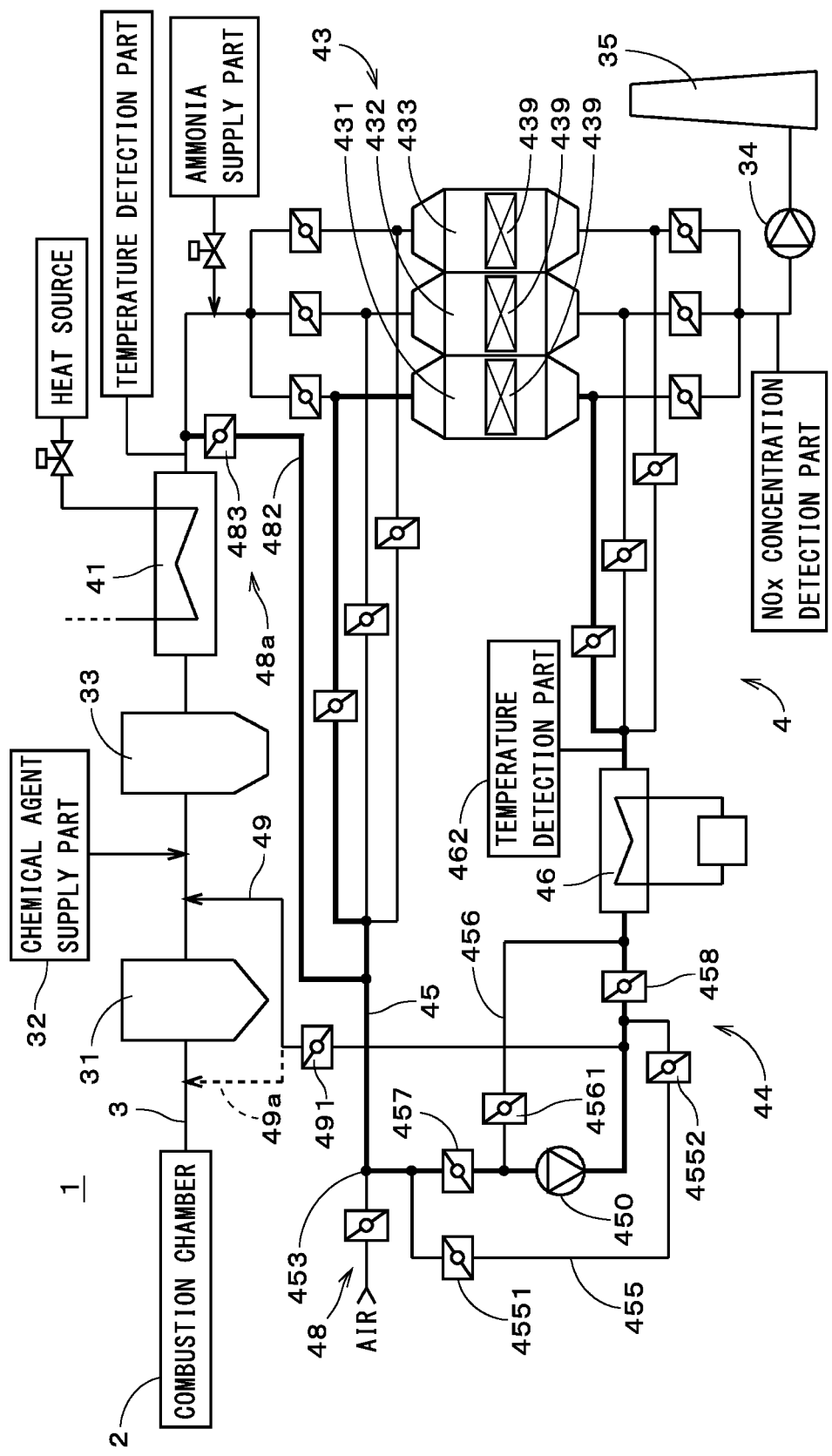
FIG. 8 is a view showing yet another example of a flue gas denitration system.

FIG. 8 is a view showing yet another example of a flue gas denitration system 4. The flue gas denitration system 4 of FIG. 8 is different from that of FIG. 6 in that two additional flow paths 455 and 456 are additionally provided in the flue gas denitration system 4 of FIG. 6. In more detail, in the circulation flow path 45, a damper 457 is provided between the introduction position 453 of the air introduction part 48 and the circulating gas fan 450, and a damper 458 is provided between the circulating gas fan 450 and the circulating gas heater 46. An end of the first additional flow path 455 is connected between the introduction position 453 of the air introduction part 48 and the damper 457 and the other end of the first additional flow path 455 is connected between the circulating gas fan 450 and the damper 458. The first additional flow path 455 is provided with two dampers 4551 and 4552. An end of the second additional flow path 456 is connected between the damper 457 and the circulating gas fan 450 and the other end of the second additional flow path 456 is connected between the damper 458 and the circulating gas heater 46. The second additional flow path 456 is provided with one damper 4561.

When the thermal recovery of the catalytic module 439 in the selected catalytic chamber is performed, the dampers 457 and 458 provided on both sides of the circulating gas fan 450 in the circulation flow path 45 are opened and the dampers 4551, 4552, and 4561 of the first additional flow path 455 and the second additional flow path 456 are closed. Like in the flue gas denitration system 4 of FIG. 6, the circulation flow path 45 including the selected catalytic chamber is thereby formed. Further, the flue gas heated by the flue gas heater 41 is introduced into the circulation flow path 45 through the flue gas introduction flow path 482. In FIG. 8, the circulation flow path 45 including the first catalytic chamber 431 and the flue gas introduction flow path 482 are indicated by heavy solid lines. The operation relating to the thermal recovery of the catalytic module 439 is the same as that in the case of FIG. 6.

Figure 9:
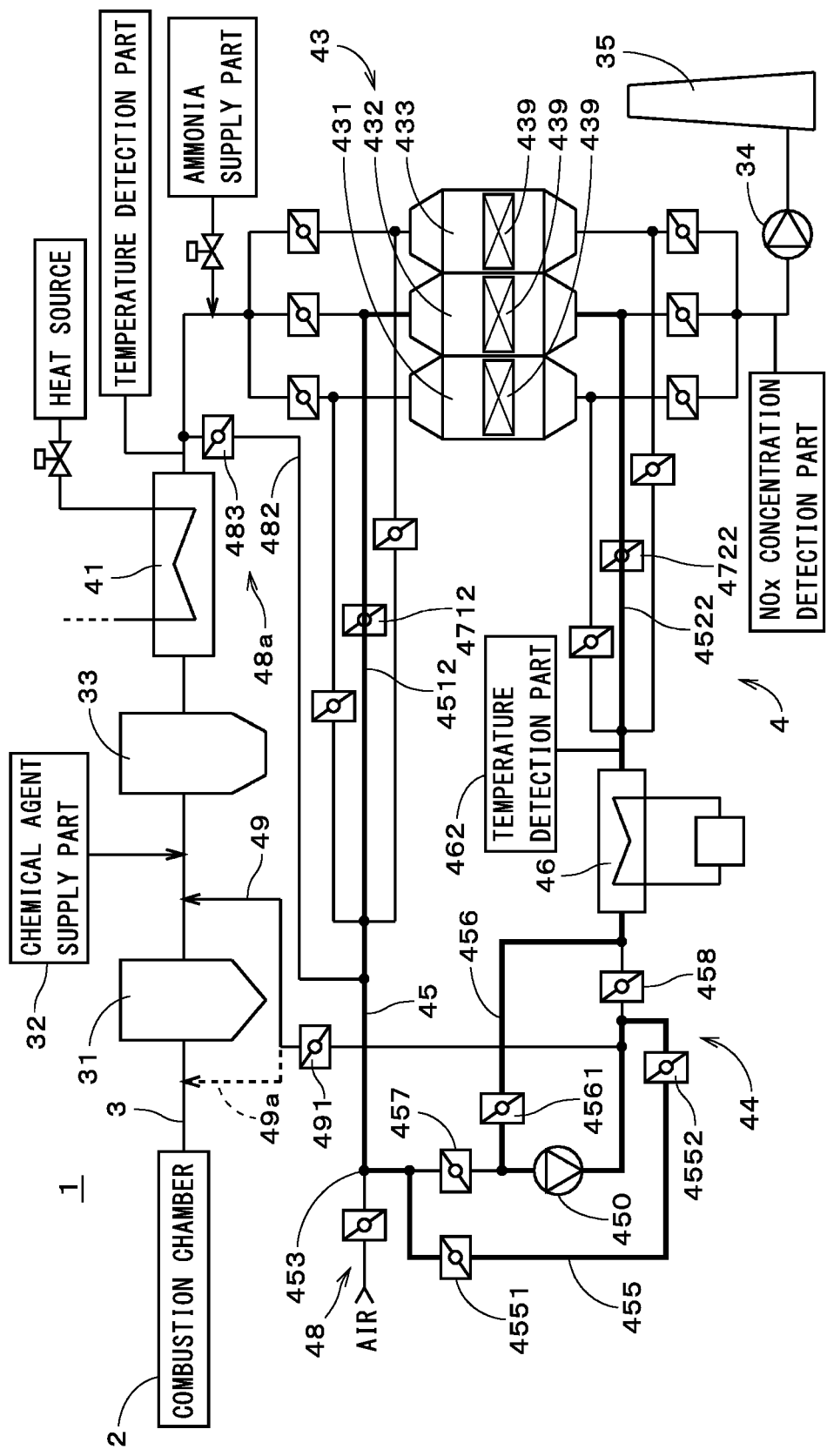
FIG. 9 is a view showing a further example of a flue gas denitration system.

On the other hand, in the first denitration state in the flue gas denitration system 4, the circulation flow path 45 including the catalytic chamber in which the thermal recovery should be performed next is warmed up. In a case, for example, where the catalytic chamber in which the thermal recovery should be performed next is the second catalytic chamber 432, the damper 4722 of the second auxiliary flow path 4522 and the damper 4712 of the first auxiliary flow path 4512 shown in FIG. 9 are slightly opened. Further, the dampers 457 and 458 provided on both sides of the circulating gas fan 450 in the circulation flow path 45 are closed and the dampers 4551, 4552, and 4561 of the first additional flow path 455 and the second additional flow path 456 are opened. Part of the flue gas passing through the second catalytic chamber 432 is returned to the second catalytic chamber 432 through the second auxiliary flow path 4522, the circulating gas heater 46, the second additional flow path 456, the circulating gas fan 450, the first additional flow path 455, and the first auxiliary flow path 4512 in this order (see the heavy solid line in FIG. 9). Further, the circulating gas heater 46 is in an OFF state and heating of the gas is not performed in the circulation flow path 45.

Thus, in the flue gas denitration system 4, the circulation flow path 45 including the second catalytic chamber 432 is warmed in the first denitration state. As a result, when the thermal recovery of the catalytic module 439 in the second catalytic chamber 432 is performed, it is possible to increase the rate of temperature rise of the circulating gas and reduce the time required for the thermal recovery. The same applies to cases where the catalytic chamber in which the thermal recovery should be performed next is the first catalytic chamber 431 and where the catalytic chamber in which the thermal recovery should be performed next is the third catalytic chamber 433.

Figure 10:
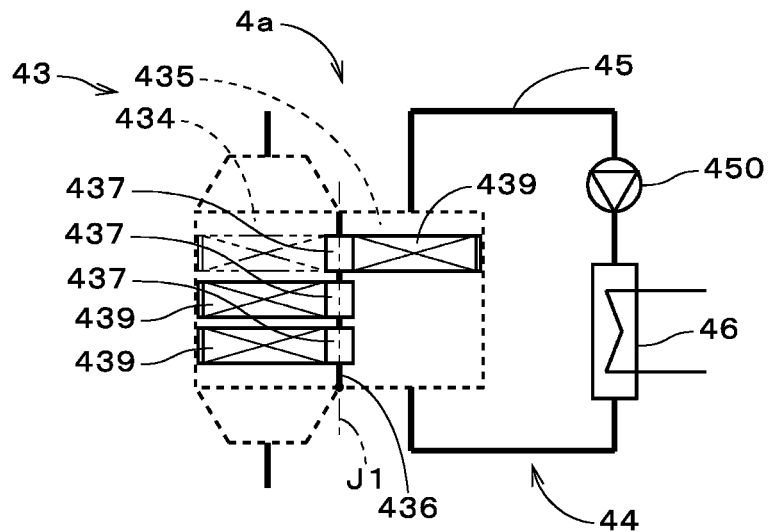
FIG. 10 is a view showing a still further example of a flue gas denitration system.
Figure 11:
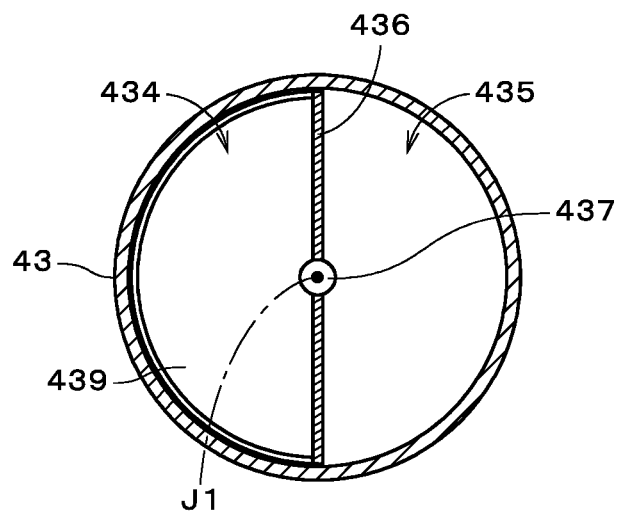
FIG. 11 is a cross section showing a catalytic reactor.

Next, a flue gas denitration system having only one catalytic chamber will be described. FIG. 10 is a view showing a still further example of a flue gas denitration system and shows part of the flue gas denitration system 4a. FIG. 11 is a cross section showing a catalytic reactor 43 in the flue gas denitration system 4a and shows a cross section perpendicular to the flow direction of the gas in the catalytic reactor 43.

In the flue gas denitration system 4a, the catalytic reactor 43 has a catalytic chamber 434 and a catalyst recovery chamber 435. In more detail, the catalytic reactor 43 has a substantially cylindrical shape with a predetermined central axis J1 as its center, and in an internal space of the catalytic reactor 43, provided is a plate-like partition wall 436 in parallel with the central axis J1. In the internal space, one of spaces partitioned by the partition wall 436 is the catalytic chamber 434 and the other space is the catalyst recovery chamber 435. In other words, the catalytic chamber 434 and the catalyst recovery chamber 435 are provided adjacently to each other. The partition wall 436 has a plurality of rotation parts 437 aligned along the central axis J1, and to each rotation part 437, the semicircular and plate-like catalytic module 439 is attached. The rotation part 437 rotates the catalytic module 439 around the central axis J1 and selectively arrange the catalytic module 439 into the catalytic chamber 434 or the catalyst recovery chamber 435. The catalyst recovery chamber 435 is included in part of the circulation flow path 45. The circulation flow path 45 has the circulating gas fan 450 and the circulating gas heater 46.

In the normal operation in the flue gas denitration system 4a, the plurality of (all the) catalytic modules 439 are arranged in the catalytic chamber 434. The flue gas flows into the catalytic chamber 434 and denitrated by using the plurality of catalytic modules 439. Further, when the thermal recovery is performed on one of the plurality of catalytic modules 439, this catalytic module 439 is arranged in the catalyst recovery chamber 435 by the rotation part 437. The circulating gas (catalyst recovery gas) heated by the circulating gas heater 46 is supplied to the catalyst recovery chamber 435 and the recovery of the catalytic module 439 is performed. The circulating gas used for the recovery of the catalytic module 439 flows into the exhaust path 3 through the connection flow path (not shown), like in the flue gas denitration system 4 of FIG. 1. On the other hand, in the catalytic chamber 434, the flue gas is denitrated by using the remaining catalytic modules 439 other than the above catalytic module 439. At that time, the heating temperature of the flue gas by the flue gas heater 41 (see FIG. 1) is made higher than that in the case where all the catalytic modules 439 are used.

As described above, also in the flue gas denitration system 4a of FIG. 10, the first denitration state in which the flue gas is denitrated by using the plurality of catalytic modules 439 in the catalytic reactor 43 and the second denitration state in which the flue gas is denitrated by using the catalytic modules 439 less than those in the first denitration state while the temperature of the flue gas flowing into the catalytic reactor 43 is made higher than that in the first denitration state by using the flue gas heater 41 are switched to each other. Thus, in the case where part of the plurality of catalytic modules 439 is used for denitration, by making the temperature of the flue gas flowing into the catalytic reactor 43 higher, it is possible to suppress deterioration in denitration performance.

Further, in the catalytic reactor 43, the plurality of rotation parts 437 operate as a position switching part, which selectively (and individually) arrange the plurality of catalytic modules 439 into the catalytic chamber 434 or the catalyst recovery chamber 435. The position switching part is controlled by a position switching control part (not shown) of the control unit 400. When one catalytic module 439 is recovered, it is thereby possible to arrange only this catalytic module 439 into the catalyst recovery chamber 435 and perform recovery of this catalytic module 439 concurrently with the second denitration state.

In the incinerator 1 and the flue gas denitration systems 4 and 4a described above, various modifications can be made.

Figure 12:
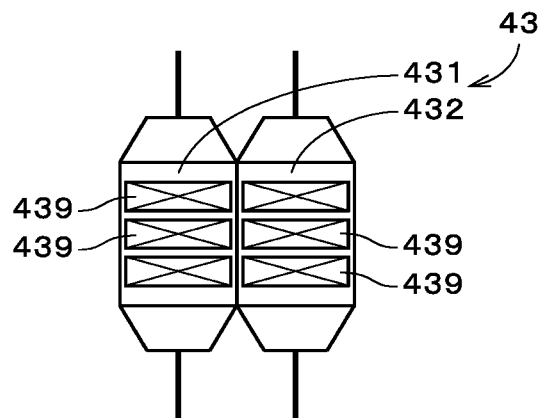
FIG. 12 is a view showing a yet further example of a flue gas denitration system.

Though the plurality of catalytic modules 439 are arranged in one catalytic chamber 434 in the flue gas denitration system 4a of FIG. 10, even when the plurality of catalytic chambers 431 and 432 are provided as shown in FIG. 12, the plurality of catalytic modules 439 may be provided in each of the catalytic chambers 431 and 432. The catalytic module 439 is a group of almost continuous catalysts, and assuming that a smallest handleable lump of catalysts is a catalyst cell (or a catalyst element), for example, each catalytic module 439 is formed of a plurality of catalyst cells which are adjacent to one another.

In the flue gas denitration system 4a of FIG. 10, there may be a case where the catalyst recovery chamber 435 is omitted and the catalytic module 439 arranged outside the catalytic chamber 434 by the rotation part 437 is detached and recovered by an external catalyst recovery apparatus. Further, in the flue gas denitration system 4 of FIG. 1, there may be a case where each of the catalytic chambers 431 to 433 is openable and closable and the catalytic module 439 in the selected one of the catalytic chambers 431 to 433 is detached and recovered by the external catalyst recovery apparatus. Furthermore, the detached catalytic module 439 may be replaced by a new catalytic module 439. In the flue gas denitration systems 4 and 4a, during recovery or replacement of part of the catalytic modules 439, it is possible to suppress deterioration in denitration performance by raising the temperature of the flue gas flowing into the catalytic reactor 43.

In FIGS. 10, 12, and 1, though the number of catalytic chambers is one to three, the number of catalytic chambers may be four or more. Further, in a case where the number of catalytic chambers is three or more, depending on the design of the system, a plurality of catalytic chambers less than the total number of catalytic chambers may be selected as the selected catalytic chambers simultaneously. In order to reduce the volume of catalysts for filling in the catalytic reactor 43, however, it is preferable that the number of selected catalytic chambers should be one.

The flue gas heater 41 may heat the flue gas by using a heating medium other than the steam of the boiler 21. Further, the circulating gas heater 46 may also heat the circulating gas by using other energy such as a gas or the like.

Depending on the temperature of the flue gas flowing into the flue gas denitration system 4 or 4a, there may be a case where only when part of the plurality of catalytic modules 439 is used for denitration, the flue gas is heated by the flue gas heater 41.

In the above-described preferred embodiment, though high-temperature air heated by the circulating gas heater 46 is used as the catalyst recovery gas, the catalyst recovery gas has only to remove deposits which deteriorate the denitration performance in the catalytic module 439, and may be, for example, a specific type of gas.

Figure 13:
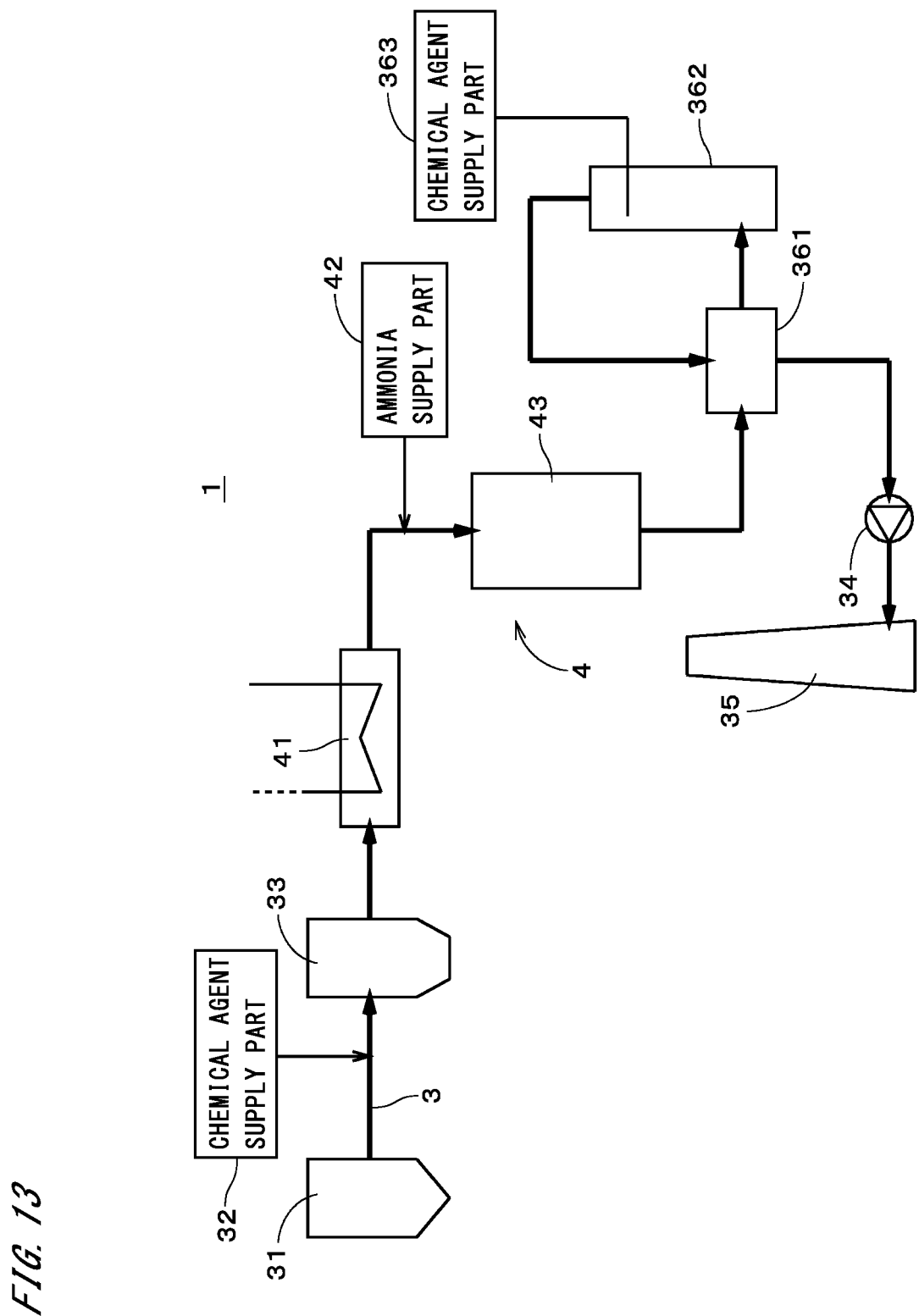
FIG. 13 is a view showing another example of an incinerator.

In the circulation flow path 45, a removal apparatus for removing $SO_3$ and $NH_3$ in the circulating gas may be provided. Further, in the exhaust path 3, in a case where a desulfurization apparatus is provided on a downstream side of the catalytic reactor 43, and the like case, the whole or part of the catalyst recovery gas discharged from the selected catalytic chamber in the catalyst recovery part 44 may flow directly into the exhaust path 3. In the exemplary case shown in FIG. 13 showing part of the incinerator 1, in the exhaust path 3, a gas-gas heater 361 and a wet scrubber 362 are provided on the downstream side of the catalytic reactor 43. The wet scrubber 362 is provided with a chemical agent supply part 363. The flue gas discharged from the catalytic reactor 43 passes through the gas-gas heater 361 and flows into the wet scrubber 362. Inside the wet scrubber 362, a chemical agent (sodium hydroxide or the like) is injected by the chemical agent supply part 363, and dechlorination and desulfurization are thereby performed. In other words, a desulfurization apparatus is implemented by the wet scrubber 362. The temperature of the flue gas passing through the wet scrubber 362 is raised by the gas-gas heater 361 and the flue gas is discharged to the atmosphere through the stack 35. In the chemical agent supply part 32 provided on an upstream side of the bag filter 33, a chemical agent such as hydrated lime or the like is injected.

In the catalytic reactor 43 of FIG. 13, when the thermal recovery of the catalytic module 439 in one catalytic chamber, e.g., the first catalytic chamber 431 in FIG. 1 is performed, by slightly opening the damper 4021, the gas used for the thermal recovery of the catalytic module 439 is guided to the wet scrubber 362 in FIG. 13. It thereby becomes possible to remove $SO_3$ and the like contained in the gas passing through the selected catalytic chamber (herein, the first catalytic chamber 431) in the wet scrubber 362. In the flue gas denitration system 4 of FIG. 13, the connection flow path 49 of FIG. 1 may be omitted.

The flue gas denitration systems 4 and 4a may be used in a facility other than the incinerator 1 and an apparatus such as a diesel engine or the like.

The configurations in the above-discussed preferred embodiments and variations may be combined as appropriate only if those do not conflict with one another.

While the invention has been shown and described in detail, the foregoing description is in all aspects illustrative and not restrictive. It is therefore understood that numerous modifications and variations can be devised without departing from the scope of the invention.

REFERENCE SIGNS LIST

1 Incinerator
2 Combustion chamber
3 Exhaust path
4, 4a Flue gas denitration system
31 Gas cooler
32 Chemical agent supply part
33 Bag filter
41 Flue gas heater
43 Catalytic reactor
44 Catalyst recovery part
45 Circulation flow path
46 Circulating gas heater
381 to 383 Inflow path
400 Control unit
431 to 434 Catalytic chamber
435 Catalyst recovery chamber
437 Rotation part
439 Catalytic module
S11 to S16 Step

The invention claimed is:

1. A flue gas denitration system comprising:
a catalytic reactor accommodating a plurality of catalytic modules, into which a flue gas flows;
a flue gas heater provided on an upstream side of said catalytic reactor in a flow direction of said flue gas; and
a control unit configured to switch between a first denitration state in which said flue gas is denitrated by using said plurality of catalytic modules in said catalytic reactor and a second denitration state in which said flue gas is denitrated by using a catalytic module(s) less than those used in said first denitration state,
wherein said control unit is further configured to cause the flue gas heater to heat the flue gas to a higher temperature in the second denitration state than that in said first denitration state.

2. The flue gas denitration system according to claim 1, wherein
said catalytic reactor has a plurality of catalytic chambers arranged in parallel with the flow of said flue gas,
said plurality of catalytic modules are accommodated in said plurality of catalytic chambers, and
a plurality of flow paths of said flue gas leading from said flue gas heater to said plurality of catalytic chambers are individually openable and closable.

3. The flue gas denitration system according to claim 2, further comprising:
a catalyst recovery part capable of selectively supplying said plurality of catalytic chambers with a catalyst recovery gas.

4. The flue gas denitration system according to claim 3, wherein
said catalyst recovery part comprises
a circulation flow path for circulating a circulating gas; and
a circulating gas heater provided in said circulation flow path for heating said circulating gas, the circulating gas heater being different than the flue gas heater,
and wherein said control unit includes a catalytic chamber selected out of said plurality of catalytic chambers in part of said circulation flow path, and
said catalyst recovery gas is said circulating gas which has been heated to a predetermined temperature or higher by circulation.

5. The flue gas denitration system according to claim 3, wherein
a desulfurization apparatus is provided in an exhaust path for discharging said flue gas from a generation source of said flue gas, and
said catalyst recovery gas passing through said selected catalytic chamber flows into an upstream side of said desulfurization apparatus in said exhaust path.

6. The flue gas denitration system according to claim 1, wherein
said catalytic reactor comprises
a catalytic chamber into which said flue gas flows; and
a catalyst recovery chamber provided adjoining said catalytic chamber, to which a catalyst recovery gas is supplied,
and wherein said control unit selectively arranges each of said plurality of catalytic modules into said catalytic chamber or said catalyst recovery chamber.

7. An incinerator comprising:
a combustion chamber in which waste is burned;
an exhaust path for discharging a flue gas generated in said combustion chamber, from said combustion chamber; and a flue gas denitration system according to claim 1, which is provided in said exhaust path.

8. A flue gas denitration method in a flue gas denitration system, wherein said flue gas denitration system comprises:

a catalytic reactor accommodating a plurality of catalytic modules, into which a flue gas flows; and a flue gas heater provided on an upstream side of said catalytic reactor in a flow direction of said flue gas, said flue gas denitration method comprising:

a) denitrating said flue gas by using said plurality of catalytic modules in said catalytic reactor; and b) denitrating said flue gas by using a catalytic module(s) less than those used in said operation a) while making a temperature of said flue gas flowing into said catalytic reactor higher than that in said operation a) by using said flue gas heater.

9. The flue gas denitration system according to claim 4, wherein a desulfurization apparatus is provided in an exhaust path for discharging said flue gas from a generation source of said flue gas, and said catalyst recovery gas passing through said selected catalytic chamber flows into an upstream side of said desulfurization apparatus in said exhaust path.

10. An incinerator comprising:

a combustion chamber in which waste is burned;

an exhaust path for discharging a flue gas generated in said combustion chamber, from said combustion chamber; and a flue gas denitration system according to claim 2, which is provided in said exhaust path.

11. An incinerator comprising:

a combustion chamber in which waste is burned;

an exhaust path for discharging a flue gas generated in said combustion chamber, from said combustion chamber; and a flue gas denitration system according to claim 3, which is provided in said exhaust path.

12. An incinerator comprising:

a combustion chamber in which waste is burned;

an exhaust path for discharging a flue gas generated in said combustion chamber, from said combustion chamber; and a flue gas denitration system according to claim 4, which is provided in said exhaust path.

13. An incinerator comprising:

a combustion chamber in which waste is burned;

an exhaust path for discharging a flue gas generated in said combustion chamber, from said combustion chamber; and a flue gas denitration system according to claim 5, which is provided in said exhaust path.

14. An incinerator comprising:

a combustion chamber in which waste is burned;

an exhaust path for discharging a flue gas generated in said combustion chamber, from said combustion chamber; and a flue gas denitration system according to claim 6, which is provided in said exhaust path.

15. An incinerator comprising:

a combustion chamber in which waste is burned;

an exhaust path for discharging a flue gas generated in said combustion chamber, from said combustion chamber; and a flue gas denitration system according to claim 9, which is provided in said exhaust path.

* * * * *